(12) United States Patent
Amouroux

(10) Patent No.: US 6,704,726 B1
(45) Date of Patent: Mar. 9, 2004

(54) QUERY PROCESSING METHOD

(76) Inventor: Rémy Amouroux, 40, rue du Général Ferrié, 38100 Grenoble (FR)

( * ) Notice: Subject to any disclaimer, the term of this patent is extended or adjusted under 35 U.S.C. 154(b) by 0 days.

(21) Appl. No.: 09/622,357
(22) PCT Filed: Dec. 27, 1999
(86) PCT No.: PCT/FR99/03294
§ 371 (c)(1),
(2), (4) Date: Nov. 7, 2000
(87) PCT Pub. No.: WO00/39709
PCT Pub. Date: Jul. 6, 2000

(30) Foreign Application Priority Data

Dec. 28, 1998 (FR) .......................................... 98 16780

(51) Int. Cl.⁷ .............................................. G06F 17/30
(52) U.S. Cl. ......................................... 707/4; 707/100
(58) Field of Search ..................... 707/3, 10, 4, 100

(56) References Cited

U.S. PATENT DOCUMENTS

| | | | |
|---|---|---|---|
| 5,832,501 A | * 11/1998 | Kain et al. | 707/103 R |
| 5,966,707 A | * 10/1999 | Van Huben et al. | 707/10 |
| 6,134,548 A | * 10/2000 | Gottsman et al. | 707/5 |
| 6,182,064 B1 | * 1/2001 | Shorter et al. | 707/3 |
| 6,212,529 B1 | * 4/2001 | Boothby et al. | 707/201 |
| 6,233,586 B1 | * 5/2001 | Chang et al. | 707/103 R |
| 6,470,332 B1 | * 10/2002 | Weschler | 707/3 |
| 6,546,381 B1 | * 4/2003 | Subramanian et al. | 707/2 |

OTHER PUBLICATIONS

Papakonstantinou et al. "A Query Translation Scheme for Rapid Implementation of Wrappers" Dec. 1995/ pp. 1–26 /Computer Science Department—Stanford University, Stanford, CA 94305 USA.

Tomasic et al. "The Distributed Information Search Component (Disco) and the World Wide Web" Jun. 1, 1997/pp. 546–548/ Sigmod Record/ Arizona USA.

Daruwala et al "The Context Interchange Network Prototype" May 30, 1995/pp. 65–92/Sloan School of Management, Cambridge, MA 02139 USA.

* cited by examiner

Primary Examiner—Greta Robinson
(74) Attorney, Agent, or Firm—Edward J. Kondracki; Miles & Stockbridge P.C.

(57) ABSTRACT

The process and architecture for database query processing includes techniques allowing a query to be made of various heterogeneous data sources by a client application using an adapter device specific to each source. The client application or client transmits a query received by the adapter device of the corresponding source to which the query is directed. The adapter device or adapter provides an internal representation of the query. The internal representation is then used to rewrite the query in a format compatible with the source. The rewritten or converted query is then transmitted to the data source with production of a filter object and initialisation of at least one filter chain. The filter object retrieves the results and filters the results through the filter chain. An answer object is produced to transfer results from a result conversion module to the client.

27 Claims, 1 Drawing Sheet

QUERY PROCESSING METHOD

FIELD OF THE INVENTION

The present invention relates to a query processing process.

BACKGROUND OF THE INVENTION

The invention more particularly relates to a query and result conversion process between a client application and a plurality of heterogeneous data sources by an adapter device, of a given architecture, specific to each data source, and the given adapter architecture enabling the implementation of said process.

Significant information of all types exists in corporate or public domain files, for example.. Most of this information cannot be processed since it is located in multiple databases, which are difficult to integrate, or in multiple word processing files. Solutions have been provided to render unprocessed data accessible via Intranet or Internet environments. These solutions do not solve the critical problems confronting data transfer managers. The information is stored in a mixed set of systems, each system having its own access protocols and its own interfaces. When information is requested by a client in the form of a query, only part of the information is generally useful for the client application's requirements. The data is never in the correct form. Most of the time, it is necessary to write an ad hoc program to convert the data into a usable format. Many items of useful information are contained in private files, and manual extraction of even partially usable information requires considerable time. The integration of new servers or databases represents laborious work and the result is generally lacking in flexibility and offers low compatibility. The main problems consist of accessing the information at its location, in its original format, converting it into a usable format and sending to the applications that require it. The query from a client is processed by an adapter. A specific adapter is associated with each data source.

OBJECTS AND SUMMARY OF THE INVENTION

Therefore, the present invention overcomes the disadvantages of the prior art by with a query processing process, common to all adapters. The process according to the invention provides a uniform access interface for information sources such as relational DMBSs (DataBase Management Systems), system files, "Lotus Notes" databases, document management systems and "Web" (World Wide Web) servers, for example. The invention makes it possible to extract information while working directly, for example, on a report. The extraction of information can also proceed while working directly on; invitations to tender or similar documents in heterogeneous formats such as HTML (HyperText Markup Language) or ASCII (American Standard Code for Information Interchange). One can obtain an object, a publication date or the position, for example, of an invitation to tender published on a server with a specified protocol such as HTTP (HyperText Transmission Protocol). The proposed process makes it possible to filter the information to select the useful information, instead of adding another specific function for each application that requires the information.

This objective is achieved in that the query and result processing process between a client and a plurality of heterogeneous data sources by an adapter device specific to each source, of a given architecture, carries out the following steps independently:

reception of the query transmitted by the client application, definition of an internal representation of the query by the adapter, use of said internal representation of the query to rewrite the query in a format compatible with the source, transmission of the converted query to the source, production of a filter object and initialisation of at least one filter chain composed of one or more "filter" components, retrieval by the filter object of the results from the source to transmit and filter them through the "filter" component chain, production of an answer object to transfer the results using the result conversion module to the client application.

According to another embodiment, the filter chain is initialised using the internal representation of the query and the filter object.

According to another embodiment, the answer object is produced from the filter chain.

According to another embodiment, the answer object is returned to the client application to enable it to retrieve the results.

According to another embodiment, metadata relating to the schema of the data in the source, the operators supported by the source and the costs associated with said operators is supplied to the client application.

The invention also aims to propose a given adapter architecture enabling the implementation of said process.

This objective is achieved in that the adapter comprises four modules, a co-ordination module acting as an interface with the client application comprising a connection component and an "answer" component, a query conversion module, comprising at least one analysis component, at least one conversion component and a process building component, a communication module with the source comprising a first "source" component and a second "source access filter" component and a result conversion module comprising third filter components all with the same interface, each module comprises components each with a specified interface.

According to another embodiment, the same application programming interface API, the same query language and the same data pattern in the form of metadata from the source are used to process each source.

According to another embodiment, the result conversion module is composed of a set of components selected from four sorts of third filter components, "operator" components applying additional limits to the answer, extraction filters, structure conversion filters and answer building filters converting the answer to the data format of the client application.

According to another embodiment, analysis components and/or conversion components are stacked.

BRIEF DESCRIPTION OF DRAWING

The present invention's other embodiments and advantages will be seen more clearly upon reading the description below referring to the figure appended, herein

DESCRIPTION OF THE PREFERRED EMBODIMENTS

Figure 1:
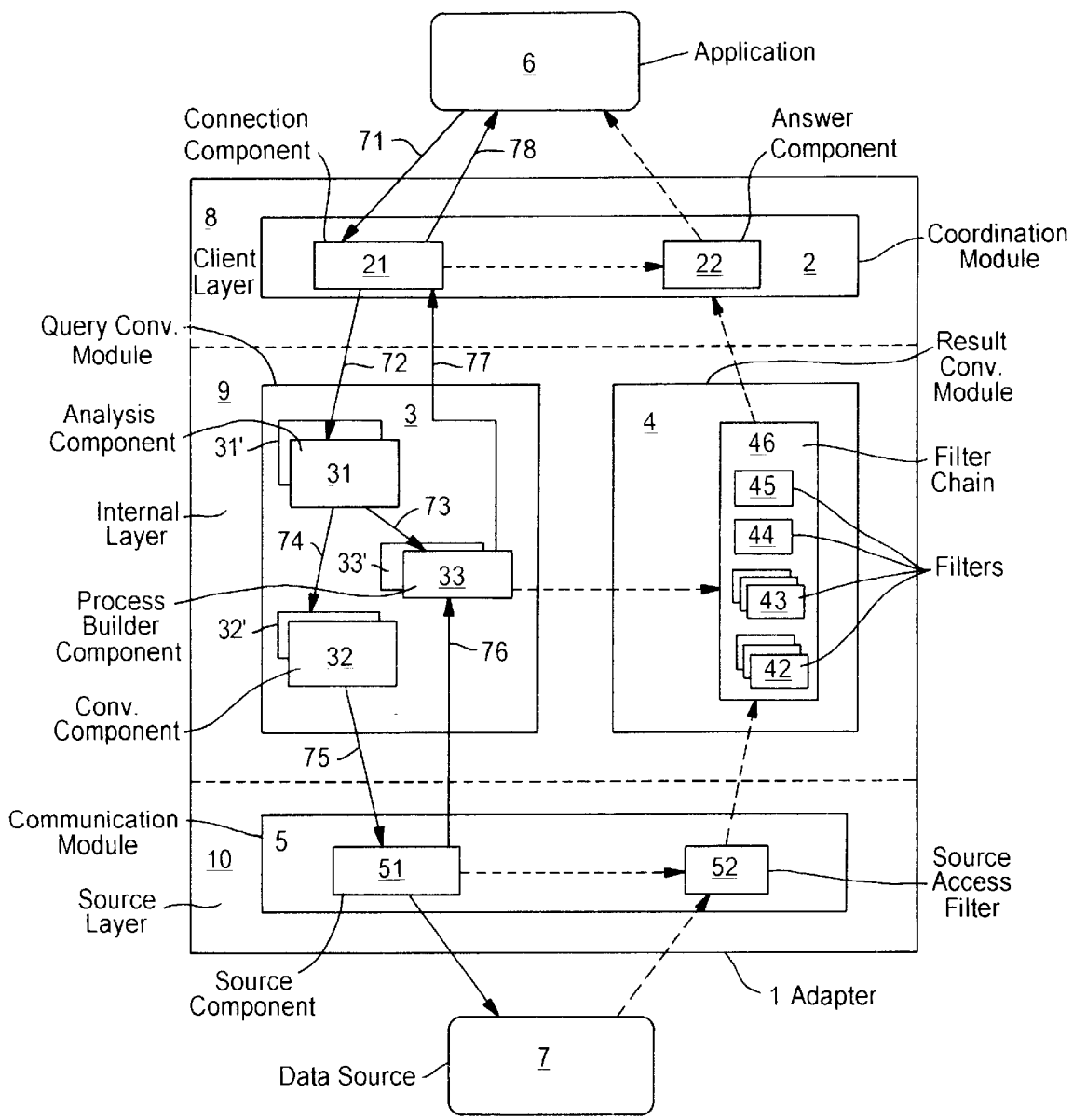
FIG. 1 represents the architecture of an adapter according to the invention and the query processing process.

With reference to FIG. 1, the adapters 1 are based on the conversion of queries and results between an application 6 and a data source 7 by a dual query rewriting and result conversion process. An adapter is associated with a source. The adapter is responsible for giving a relational view of the source to which it is attached. The queries from the client application 6 are analysed and then converted into queries supported by the data source 7 manager, the query parameters are extracted and used to guide the conversion of the result. The results are converted by means of information extraction and restructuring processes. The adapters may be used directly to access data sources from applications. The client application 6 may be any application requiring access to a data source in a structured relational form.

The architecture of the adapter 1 according to the invention may be broken down into four main modules: a co-ordination module 2, a query conversion module 3, a result conversion module 4 and a communication module with the source 5. The co-ordination module 2 acts as an interface with the client application 6. The co-ordination module 2 communicates with the client application 6 by exchanging queries and answers with the client application 6. The query conversion module 3 is responsible for analysing the query received and its conversion into operations supported by the data source 7 manager. The result conversion module 4 is responsible for rebuilding results, converting the data types from the source into data types for the client application 6 as a general rule, and producing the answer sent to the client application 6. The adapters offer query characteristics and data patterns based on a relational database technology so as to obtain a uniform access to different data sources. This implies conversion of a database type query into a non-database type query and the conversion of non-structured results into results with a relational structure.

The communication module 5 with the source is responsible for communication with the source 7 and encapsulates answers in data structures compatible with the source in data structures compatible with the adapter 1. Its role is firstly to send the query to the source and secondly to retrieve the results returned by the source 7.

Each module is composed of a set of components. The function of each module and the different components used to build them will now be described. The modules composing the architecture may be classified into three different layers: the "Client" layer 8, the internal layer 9 of the adapter and the "Source" layer 10. The difference between these three layers is based on their role. The "Client" layer 8 and the "Source" layer 10 handle the containers, i.e. the interface provided for the client application and source interface processing. The "Client" layer 8 comprises the co-ordination module 2 and the "Source" layer comprises the communication module 5 with the source. The internal layer 9 of the adapter handles the content, i.e. the queries received from the client application and sent to the source 7 and the data received from the source and sent to the client application. The internal layer 9 comprises the query conversion module 3 and the result conversion module 4. In a given adapter, by means of the homogeneous structure of the interfaces irrespective of the language used by the application or by the source, it is possible to stack several internal layers 9 on top of each other, each of the layers being adapted to a different language, while having a single "Client" layer 8 and a single "Source" layer 10.

Said stacking is defined by an adapter configuration file. Using said configuration file, the client application determines the adapter used.

The "Client" layer 8 comprises the components handling the access for the client application. Its role is to act as an interface with the client application. The client layer components form an interface used by the client application 6. The co-ordination module 2 of said client layer has four main responsibilities. Firstly, a connection component 21 accepts a query 71 from a client application and sends 72 the query to the query conversion module 3. Secondly, an "Answer" component 22 is used to transfer the result, from the result conversion module 4, to the client application 6. Thirdly, it sends the client application metadata, relating to the data schema in the source, the query operators with their costs when required. Metadata is data on the structure of the data itself. Fourthly, it initialises the other components of the adapter dynamically and configures said components.

The internal layer 9 of the adapter comprises the components that handle data conversion. Two modules are associated with the two main conversions carried out; these are the query conversion module 3 and the result conversion module 4. The main functions of the query conversion module 3 consist, firstly, of rewriting the query from the co-ordination module as a query that can be submitted to the data source 7 and, secondly, of initialising the result conversion module 4 to process the results retrieved from the source 7. This is carried out in three phases. Firstly, the incoming query is analysed to identify the elements used, during the production of the query accepted by the source and during the conversion of the results. These elements are the names of the relation, the attributes of the projection and the selection and join predicates. This step, consisting of defining an internal representation of the query, is carried out by an analysis component 31. Secondly, the information composed of these elements is used in a conversion component 32 which rewrites the query in a format that can be accepted by the data source 5 manager. Thirdly, the information is used by a "process builder" component 33 to initialise all the filters required. The query submitted to the data source provides a set of answers which are then filtered to produce a correct answer for the client application. It may be necessary to pass said set of answers through the filters to extend or increase a data source manager's query processing capabilities. The query is analysed by the component 33 to initialise filters as a function of the client application's requirements.

The result conversion module 4 is responsible for extracting the relevant information in the answers obtained by the communication module with the source 5. This module 4 is also responsible for converting said answers, if required, and then formatting the answer in the data format of the client application 6. This module is composed of a stack of components 42 to 45 called filters. The passage through this filter chain 46 consists of data extraction, checking with reference to the initial query and conversions. The filters of the result conversion module 4 all comprise the same interface including "open", "get-next" and "close" methods and process data in the same internal format. In this way, the filters may be concatenated in any order according to the extraction, checking and conversion requirements. There are four classes of filters. "Operator" filters 42 apply additional limits, corresponding to selection or projection operators, for example, to the answer returned by the source. Extraction filters 43 produce an information extraction and structuring method chain. A structure conversion filter 44 may be used to retrieve the data structure. These three types of components may be used several times in the chain with different initialisations to carry out conversions, which are impossible only using one filter. An answer building filter 45 ends the chain. This filter converts the answer from the adapter's 1 internal data format to the client application's data format.

The "Source" layer 10 comprises the components that handle the access of the source 7, so as to send a query to the source and retrieve the results. A first "Source" component 51 accepts queries in the data source format from the query conversion component 32. A second "Source access filter" component 52 retrieves the results returned by the source according to the source's protocol, said result being in the form, format and encoding used by the source. Said component 52 converts said results to send them to the filter chain 46 in the internal format of the internal layer 9 of the adapter. The co-ordination module 5 with the source 7 has two functions. It sends a query to the data source, e.g. an SQL (Structured Query Language) or HTTP query. It uses the "filter" interface of the result conversion module 4 to return the next element of the answer from the data source in the adapter's internal data format.

The processing of queries received from clients by the adapter will now be described with reference to FIG. 1 wherein the continuous line full-headed arrows represent the path of a query, a representation of a query or a specific item of information and the dotted line hollow-headed arrows represent process object creation operations. When a client 6 has queries to send to an adapter 1, it opens a connection to the adapter using a "Wrapper" interface (appendix 1) and submits the queries to the adapter. The connection component 21 receives the query 71 and transmits the query 72 via the "Analysis" interface to the query conversion module 3. In a first phase, the adapter uses the query analysis component 31 comprised in the query conversion module 3 to define an internal representation 73, 74 of the query sent to the conversion component 32 in a format compatible with the "Request Builder" interface. Said internal representation 73, 74 is also compatible with the "Process Builder" interface of the processing component 33. In the second phase, the representation 74 of the query is used by the query conversion component 32 to convert the initial query 71 from the client application in a format compatible with the "Source" interface that the source can understand. The converted query 75 is submitted to the source via a "Source" component 51 of the source layer and a filter object corresponding to the "Source access filter" component 52 is produced. Said filter object 52 provides the "Filter" interface (represented in appendix 1 by references 18 and 181 to 184) of the result conversion module. Said filter object 52 is the first element of the filter chain to filter and is used to retrieve the results from the source by means of "open" 182, "next" 183 and "close" 184 methods. In a third step, the adapter uses a "process builder" or "filter initialiser" component 33 to initialise the filter(s) required in the filter chain to complete the first filtering operation 52 so as to produce an answer compatible with the adapter's format. To initialise said filters, the adapter gives said process builder 33, firstly, an internal representation 73 of the query by a function that uses the "Analysis" interface results as parameters and, secondly, by the arrow referenced 76, the filter object 52 produced by the source component 51. Said process builder 33 reproduces a filter chain 46 composed of various filter components 42 to 45. The terminal phase consists of building an answer object, corresponding to the "Answer" component 22. Said answer object is produced by the connection component 21 using a filter chain 46 that the process builder 33 supplies via the link 77. Then, the connection component 21 gives the client application 6 the answer object. The client application uses the "Answer" interface 12 of said component 22, comprising "open", "next" and "close" methods to retrieve the results in the interface's specific data format.

The interfaces used between the different layers and the different modules will now be described. Said interfaces are part of the definition of a common architecture for all the adapters. The interfaces of the different components are common to all the adapters.

The following interfaces in appendix 1 and 2 are used to submit a query, retrieve results and manage an adapter in operation. The notation used for the interfaces is as follows "vectorgetSelectClause( )", wherein the content between brackets expresses the parameters used by the "getSelect-Clause" function and "vector" expresses the form of the results supplied by the function used by the interface. Said result may be in string, boolean, vector or object form. The "Client" layer defines the interfaces and components enabling the use of an adapter. The interfaces of the "Client" layer 8 enable the local or remote use of the adapter. The "Client" layer 8 comprises two specific interfaces, a first interface for connection 11, appendix 1, called the "Wrapper", and adapter administration 13, appendix 1, provided by the connection component 21 and a second "Answer" interface 12 provided by the "answer" component 22. The first "Wrapper" interface provides the client application with access to the basic services of an adapter 1. Said interface comprises a first "query" method 111 which uses an object as an input argument. Said "query" method enables the reception of the query from the client application, using an object representing the query sent by the client application as the input argument. Said "query" method also enables the return 78 of the answer object 22, providing a number of functions defined in the "Answer" interface 12, to the client application. A second "GetCapability" method 112 of the first "Wrapper" interface does not take any input argument into account. Said second method returns a character string encoding the list of query operators supported by the adapter and their conditions for use representing the adapter's capabilities. The character string describes the operators supported by the adapter and the way in which they can be combined. The operators that can be used are search, select, project, merge and combine objects. Each adapter supports a subset of said operators. Using said "GetCapability" function 112, the client application knows which query operators are supported by each of the adapters used by the client application and can thus optimise its query. A third "getSchema" method 113 of the first "Wrapper" interface does not take any input argument into account and returns a character string forming a list of types. Each type describes the internal representation of a class of the schema of the data on the source. The types are built using, firstly, basic types such as integer, real, boolean, string and, secondly, builders for sets and "tuples". A tuple is a list of (attribute-value) pairs. The types are defined when the adapter is created. Said third method is used to send the data structure in the source to the client application and thus enable the client application to retrieve the results. A fourth "getSchema" method 114 of the first "Wrapper" interface 11 does not take any arguments into account and returns a string encoding the cost information associated with each operator. The cost information used to evaluate the time and memory of the result of a query. The client application maintains a cost model in order to select the best execution plan, i.e. the best filter chain. A default cost model is defined on the client application. To improve said model, the costs are sent from the adapters to the client application using the function of the fourth "getSchema" method 114.

The second "Answer" interface 12, appendix 1, provides the client application 6 with the services to retrieve the results of the submitted query. Said interface comprises different methods. A first "getAll" method 121 of the second "Answer" interface does not take any input into account and returns a set of "tuples", lists of (attribute-value) pairs. This function returns a set of all the tuples returned by the sources and filtered by the adapter. The second method (open) 122 of the second "Answer" interface does not take any input and does not produce any output. It runs the initialisation procedure required before the first "tuple" can be sent to the client application. A third "getNext" method 123 of the second "Answer" interface does not take any arguments into account and returns a "tuple" object. Said object sets a "tuple" which is part of the answer to the subqueries provided to the answer object of the "Answer" component 22. If there are no other tuples in the response, it returns "null". A fourth "close" method 124 of the second "Answer" interface takes no arguments. It runs cleaning operations. It does not have any effect if it is called before an open call. This function may be called before the last "tuple" is retrieved. When an open call using the first method (open) occurs after a close call by the fourth method (close), the third method (getnext) returns "null", even if the close was run before the end of the entire answer.

The "Client" layer 8 comprises a third "AdaptaterAdmin" interface 13, appendix 1, enabling the initialisation and configuration of the adapter's components according to the source access parameters. Said third interface provides administration services used to manage an adapter during or after initialisation.

The different interfaces of the "Client" layer described above may be replaced by a JDBC (Java DataBase Connectivity) interface. "Java" is a new programming language, devised by "Sun", based on C++. JDBC is a utility for connecting "Java" to databases. Said fourth JDBC database 14, appendix 1, is a standard SQL database access interface, providing uniform access to a wide range of databases. Since the query is an object, said JDBC interface 14 may be used with any type of database provided that there is an underlying conversion component. A JDBC manager needs to process SQL queries, which may not be ensured at interface level. If the selected adapter programmer for the analysis component 31 in the query conversion module 3 is an SQL grammatical analyser, the adapter will be completely JDBC-compatible. Although the interfaces will not be the same, characteristics found in the interfaces 11, 12, 13 of the "Client" layer described above may be found in the fourth JDBC interface. The different JDBC interfaces listed below, "java.sql.Driver", "java.sql.Connection", "java.sql.ResultSet" and "java.sql.DatabaseMetadata" belong to the JDBC standard. Producing the "java.sql.Driver" interface 141 replaces the third "AdaptaterAdmin" interface described above. The configuration must be carried out before the database connection. Producing the "java.sql.Connection" interface 142 performs the same role as producing the "Wrapper" interface for retrieving metadata and submitting the query. Producing "java.sql.ResultSet" 143 performs the same role as producing the "Answer" interface 12 to retrieve the results. The methods to retrieve the adapter's capabilities and the cost information correspond to "java.sql.DatabaseMetadata" interface methods.

The query conversion module 9 must contain three elements for each adapter: an analysis component 31, a query conversion component 32 and a process building component 33 which may each be stackable. Thus, for another client language, the adapter will use another analysis component 31', another query conversion component 32' and another process building component 33', each being adapted to said other language, but uses, for a given component, the same interface composition methods. Each has its own interface used by the co-ordination module 2 to finally generate an execution plan, i.e. the filter chain 46, is defined by the "ProcessBuilder" components from the configuration file and the information extracted from the query by the analysis component for a received query. A first "Analysis" interface 15 contains the methods to be implemented by a query analyser 31. The query is considered as something similar to SQL queries. The query is given to the analyser 31 during creation or with a first "setRequest" method 151. The query format is dependent on the interface produced. The analyser must extract different elements from the query and uses the different methods below.

A second "getSelectClause" method 152 returns a string type list (name, alias) of the projected attributes ("selectclause"). A third "getFromClause" method 153 returns a relation ("from clause") string type list (name, alias). A fourth "getWhereClause" 154 returns a predicate describing the selection condition ("where clause"). The format of the predicate is dependent on the implementation. A fifth "getGroupByClause" method 155 returns an attribute (groupby clause) string type list (name, alias). A sixth "getHavingClause" method 156 returns a predicate using all the operators used to select the groups (having clause). The format of the predicate is dependent on the implementation. The query may be analysed in phases by stacking different analysers. A stack 31, 31', etc. of analysis components may be required to solve conversion problems, for example.

A second "Request Builder" interface 16 contains the methods to be implemented by a query conversion component 32. The incoming query is defined as the output of the analyser described above ("select clause", "from clause", "where clause", "groupby clause" and "having clause"). The query is given to the conversion component during creation or with the "setRequest" method 161. This method returns the value "true" if everything is correct, otherwise, it returns "false". The format of the converted query depends on the type of format that can be accepted by the source. Another "getTranslatedQuery" method 162 returns the conversion of the query given above. As for the analysis components, different conversion components 32, 32', etc. may be stacked.

A third "Process builder" interface 17 contains the signatures of the method to be implemented by a process builder 33. The process builder 33 needs to produce the execution plan. The process builder supplies the filter chain 46, which forms the main component of the execution plan corresponding to the given query. A first method 171 is used to give the process builder 33 the information required, extracted by the analysis component 31, to generate the execution plan. A second method 172 is used to give the process builder 33 the first filter element of the execution plan. Said first element is the filter object corresponding to the "Source access filter" component 52, supplied by the source component 51 after the converted query is submitted, and used to retrieve the results from the source. A third method 173 returns the execution plan 77, i.e. the filter chain 46 calculated for the query, to the connection component 21.

The result conversion module 4 contains interfaces and classes making it possible to build a filter chain which processes the data from the source before sending it to the client application. The following interfaces and classes are used for each component of said module so to reduce the dependence of the components and favour the reuse of said components. Each filter component 42 to 45 must produce a "Filter" interface 18. This interface is used to compose a filter chain 46 by inserting any filter component in any position. A first "initialize" method 181 initialises the filter with the given list of parameters contained in a hashtable. A second "open" method 182 open the data stream sent by the chain. A third "next" method 183 returns a "DataFormat" class object representing a tuple. This method is used to take the tuples of the same query in succession. A fourth "close" method 184 closes the data stream sent by the chain.

A "DataFormat" class 60 defines the common data processing structure in the adapter. In the case of the filters, it corresponds to an attribute-value pair list or "tuple" which is transmitted from one filter of the chain to the next filter. A set of methods 61, given as an example in appendix 2, is used to process a tuple containing semi-structured data defined by the "DataFormat" class.

The result conversion module may comprise additional interfaces to enable parallel processes, for example.

The source layer components 10 must produce a "Source" interface 62, appendix 2, so as to be used by the connection component 21 of the co-ordination module to retrieve the information in the form of metadata and send the query to the source. This interface comprises a first "checkMetadata" method 621 which checks the availability of the metadata. Said interface comprises a second "getMetaData" method 622 which retrieves the metadata sent by the source and converts it into a format compatible with the top client layer. A third "sendQuery" method 623 receives a query compatible with the source, produces and returns 76 a filter object 52 to the process builder 33 to retrieve the results.

If the source component 51 is configurable during the processing time, it must produce another interface 63, called the "Admin" interface. Said interface comprises a first "setconfig" method 631 to give the configuration parameter to the source component. The source component programmer must supply the format and form of said parameter(s). The interface uses a second "getconfig" method 632 to retrieve the configuration parameters available in the adapter.

The adapters according to the invention offer numerous advantages. It offers a uniform access interface to heterogeneous information sources, each interface being based on a minimum number of carefully selected methods. The same application programming interface API, the same query language and the same data pattern can be used to process each source, even if said sources are totally different in terms of access protocol, query language and data pattern. Only the objects to which the methods are applied are modified as a function of the source languages and the client application languages.

The definition of a generic architecture with common interfaces for the components included in the adapter's modules makes it possible to produce, for example, reusable source 5 connection 21, analyser 31, converter, 32, filter 42 to 45, processing 33 components. Said components may be reused in several adapters with no modifications. The composition of reusable components in component chains enables programmers to produce adapters easily. Upgrading of data sources and upgrading of components may be supported easily by connecting the components in component chains already existing in the adapter or by replacing one component by another. The rapid creation of robust adapters is based on these reusable components. The common architecture according to the invention may be used with libraries of reusable components to create adapter families characterised by a common data manager, e.g. "Lotus Notes", or to create specialised adapters produced for a specific data source. A distinction may be made between three types of components as a function of their dependence on the data manager of the associated source. Said dependence governs the way in which the components can be reused from one adapter to another. Certain components are specific to an adapter and cannot be reused. For example, query building for a WWW (World Wide Web) search engine depends on the language accepted by the specific source. Certain components are common to an adapter family. For example, the HTTP communication module may be reused for all the adapters associated with a data source based on a Web site. Certain components are common to all adapters. For example, the projection and selection filters applied on the data obtained from the source do not depend on the source and may potentially be reused to build each adapter.

The process according to the invention makes it possible to supply "metadata" to the client application to optimise the queries and enable improved use of the source. The adapter obtains metadata on the data source, enabling a programmer to build applications using said metadata dynamically, thus rendering the application reusable with totally different sources. Building and management of said applications are thus easier.

It is clear that other modification that may be made by specialists come within the scope of the invention.

Appendix 1

"Wrapper" interface: 11
  Answer query (object request) 111
  String getCapability ( ) 112
  String getSchema ( ) 113
  String getCost ( ) 114
"Answer" interface: 12
  Set getAll ( ) 121
  open ( ) 122
  Tuple getNext ( ) 123
  close ( ) 124
"AdapterAdmin" interface: 13
  JDBC interface: 14
  java.sql.Driver 141
  java.sql.Connection 142
  java.Sql.ResultSet 143
"Analysis" interface: 15
  boolean setRequest (Object query) 151
  Vector getSelectClause ( ) 152
  Vector getFromClause ( ) 153
  Object getWhereClause ( ) 154
  Vector getGroupbyClause ( ) 155
  Object getHavingClause ( ) 156
"Request Builder" interface: 16
  boolean setRequest (Vector selectClause, Vector fromClause, Object whereClause, Vector groupbyClause, Object havingClause) 161
  Object getTranslatedQuery ( ) 162
"Process Builder" interface: 17
  setRequest (Vector selectClause, Vector fromClause, Object whereClause, Vector groupbyClause, Object havingClause) 171
  void setSourceFilter (Filter source) 172
  Filter getProcess ( ) 173
"Filter" interface: 18
  initialize (Hashtable params, Filter previous) 181
  open ( ) 182
  DataFormat next ( ) 183
  close ( ) 184

Appendix 2

"dataformat" class: 60 61

- setatt (string name, object value): "give value of name of given attribute"
- removeatt (string name): "remove attribute given by its name"
- string getattname (int index): "return name of attribute corresponding to index"
- int getattindex (string name): "return index of attribute corresponding to name"
- object getattvalue (int index): "return value of attribute corresponding to index"
- object getattvalue (string name):"return value of attribute with given name"
- boolean isattribute (strong attrname): "find out if an attribute is already defined"
- int getnumatt ( ): "return the number of attributes in the tuple"
- appendslast (dataformat to add): "add given dataformat to present object"
- dataformat getcopy ( ): "return clone of this object"
- string to stringo : "return string type representation of object"

"source" interface: 62

- boolean checkmetadata ( ) 621
- dataformat getmetadata ( ) 622
- filter sendquery (object query) 623

"admin" interface: 63

- setconfig (hashtable parameters) 631
- hashtable getconfig ( ) 632

What is claimed is:

1. A query and result processing process between one or a plurality of client applications, and a plurality of heterogeneous data sources by an adapter specific to each source, and having a format of a given architecture, characterised in that the process carries out the following steps independently:
   - reception of a query transmitted by an application in a format compatible with a client,
   - defining of an internal representation of the query in an adapter by a format of the adapter,
   - rewriting the query in a format compatible with the source by use of said internal representation of the query by an internal format conversion component in a source format,
   - initialising at least one filter chain composed of one or more filter components by transmitting of the converted query to a source, producing a filter object and using an internal representation by a process building component,
   - initialising in the filter chain the filter component (s) required to complete a first filtering operation resulting from the filter object so as to produce an answer compatible with the adapter's format,
   - retrieving by the filter object the results from the source to transmit and filter the results through the initialised filter components in the chain, and
   - producing an answer object to transfer results from a result conversion module to a client application.

2. A processing process according to claim 1, characterised in that, for defining the internal representation, a plurality of components are stacked, including analysis components and conversion components.

3. A processing process according to claim 1 characterised in that the filter chain is initialised using the internal representation of the query and the filter object.

4. A processing process according to claim 1 characterised in that the answer object is produced using initialised filter components in the filter chain.

5. A processing process according to claim 1, characterised in that the answer object is returned to the client application for retrieving the results.

6. A processing process according to claim 1, characterised in that metadata relating to the schema of the data in the source, the operators supported by the source and the costs associated with said operators is supplied to the client application.

7. A processing process according to claim 2 characterised in that the filter chain is initialised using the internal representation of the query and the filter object.

8. A processing process according to claim 2 characterised in that the answer object is produced using initialised filter components in the filter chain.

9. A processing process according to claim 2, characterised in that the answer object is returned to the client application for retrieving the results.

10. A processing process according to claim 2, characterised in that metadata relating to the schema of the data in the source, the operators supported by the source and the costs associated with said operators is supplied to the client application.

11. An adapter architecture operable for a query and result processing process between one or a plurality of client applications, and a plurality of heterogeneous data sources by an adapter specific to each source, and having a format of a given architecture, wherein the process, that the adapter architecture carries out includes following steps:
    - reception of a query transmitted by an application in a format compatible with a client,
    - defining of an internal representation of the query in an adapter by a format of the adapter,
    - rewriting the query in a format compatible with the source by use of said internal representation of the query by an internal format conversion component in a source format,
    - initialising at least one filter chain composed of one or more filter components by transmitting of the converted query to a source, producing a filter object and using an internal representation by a process building component,
    - initialising in the filter chain the filter component (s) required to complete a first filtering operation resulting from the filter object so as to produce an answer compatible with the adapter's format,
    - retrieving by the filter object the results from the source to transmit and filter the results through the initialised filter components in the chain, and
    - producing an answer object to transfer results from a result conversion module to a client application; and further characterised in that the adapter architecture comprises four modules including:
      (a) a co-ordination module acting as an interface with a client application and including a connection component and an answer component;
      (b) a query conversion module, including at least one analysis component, at least one conversion component and a process building component;
      (c) a communication module with the source including a source component and a source access filter component; and (d) a result conversion module including filter components all having the same interface; and each module including components, each with a specified interface.

12. The adapter architecture according to claim 11, characterised in that the same application programming interface (API), the same query language and the data pattern in the form of metadata from the source are used to process each source.

13. The adapter architecture according to claim 12, characterised in that the result conversion module is composed of a set of components selected from the group consisting of the following four types of filter components: operator components applying additional limits to the answer, extraction filters performing an information extraction or structuring method chain, structure conversion filters to retrieve the data schema, and answer building filters converting the answer to the data format of the client application.

14. The adapter architecture according to claim 13, characterised in that a plurality of components are stacked including analysis components and conversion components.

15. The adapter architecture according to 30, comprising incoming query analysis means to identify a plurality of elements used in producing the query accepted by the source and in converting the results from the source, the elements including: names of the relation, attributes of the projection, and selection and concatenation predicates.

16. The adapter architecture according to claim 11, characterised in that the filters of the result conversion module all comprise the same interface including OPEN, GET-NEXT and CLOSE methods and process data in the same internal format, the filters being concatenated in any order according to the extraction, checking, and conversion requirements.

17. The adapter architecture according to claim 13, characterised in that first three types of components may be used several times in the chain with different initialisations to carry out conversions, which are impossible only using one filter.

18. The adapter architecture according to claim 11, characterised in that the interfaces with the client application enable the local or remote use of an adapter.

19. The adapter architecture according to claim 13, characterised in that each adapter supports a subset of said usable operators selected from the search, select, project, merge and combine operators.

20. The adapter architecture according to claim 11, characterised in that a method is used to send the data structure in the source to the client application and thus enable the client application to retrieve the results.

21. The adapter architecture according to claim 11, characterised in that the connection component uses an interface composed of a first query reception method, a second getCapability encoding method for the list of query operators supported by the adapter, a third getSchema internal representation method of a schema class for the data on the source, a fourth getCost method encoding the cost information associated with each operator used to evaluate the time and memory of the result of a query, the second, third and fourth methods presenting the information in string form.

22. The adapter architecture according to claim 11, characterised in that the analyzer extracts, by means of a first setRequest method, different elements of the query and uses the different methods listed below, a second getSelectClause method which returns a string type list name (name, alias) of the projected attributes (selectclause), a third getFromClause method which returns a relation (from clause) string type list name (name, alias), a fourth getWhereClause which returns a predicate describing the selection condition (where clause), a fifth getGroupByClause method which returns an attribute (groupby clause) string type list (name, alias) and a sixth getHavingClause method which returns a predicate using all the operators used to select the groups (having clause).

23. The adapter architecture according to claim 22, characterised in that the format of the predicate is dependent on the implementation.

24. The adapter architecture according to claim 12, characterised in that the result conversion module is composed of a set of components selected from the group consisting of the following four types of filter components: operator components applying additional limits to the answer, extraction filters performing an information extraction or structuring method chain, structure conversion filters to retrieve the data schema, and answer building filters converting the answer to the data format of the client application.

25. The adapter architecture according to claim 12, comprising incoming query analysis means to identify a plurality of elements used in producing the query accepted by the source and in converting the results from the source, the elements including: names of the relation, attributes of the projection, and selection and concatenation predicates.

26. The processing process according to claim 1, characterised in that the plurality of client applications each use a different query language.

27. The adapter architecture according to claim 11, characterised in that the plurality of client applications each use a different query language.

* * * * *

UNITED STATES PATENT AND TRADEMARK OFFICE
CERTIFICATE OF CORRECTION

PATENT NO. : 6,704,726 B1
DATED : March 9, 2004
INVENTOR(S) : Amouroux

It is certified that error appears in the above-identified patent and that said Letters Patent is hereby corrected as shown below:

<u>Column 13,</u>
Line 22, please delete the numvber "30" and substitute the number -- 11. --

Signed and Sealed this

Twenty-fifth Day of May, 2004

JON W. DUDAS
*Acting Director of the United States Patent and Trademark Office*